US006631169B1

(12) United States Patent
Wu et al.

(10) Patent No.: US 6,631,169 B1
(45) Date of Patent: Oct. 7, 2003

(54) APPARATUS AND METHOD FOR GMSK BASEBAND MODULATION BASED ON A REFERENCE PHASE TO BE SIMPLIFIED

(75) Inventors: Ming-Chou Wu, Taipei (TW); Hsu-Hsiang Tseng, Taoyuan (TW)

(73) Assignee: Syncomm Technology Corporation, Taoyuan (TW)

( * ) Notice: Subject to any disclaimer, the term of this patent is extended or adjusted under 35 U.S.C. 154(b) by 0 days.

(21) Appl. No.: 09/472,697

(22) Filed: Dec. 27, 1999

(51) Int. Cl.⁷ .............................. H03C 3/00; H03D 3/24
(52) U.S. Cl. ....................... 375/305; 375/327
(58) Field of Search ................ 375/327, 305, 375/316, 303–376, 127, 222; 332/127; 455/112

(56) References Cited

U.S. PATENT DOCUMENTS

| 5,144,256 A | * | 9/1992 | Lim ........................ 329/302 |
| 5,187,719 A | * | 2/1993 | Birgenheier et al. ........ 375/226 |
| 5,467,373 A | * | 11/1995 | Ketterling .................. 375/327 |
| 6,122,327 A | * | 9/2000 | Watanabe et al. ........... 375/316 |
| 6,157,271 A | * | 12/2000 | Black et al. ................ 332/127 |

OTHER PUBLICATIONS

Linz, A. and Hendrickson, A., "Efficient Implementation of an I–Q GMSK Modulator", Jan. 1996, IEEE Transctions on Circuits and Systems–II: Analog and Digital Signal Processing, vol. 43, No. 1, pp. 14–23.*

Hasperlagh et al., "A 270–kb/s 35–mW Modulator IC for GSM Cellular Radio Hand–Held Terminals", Dec. 1990, IEEE Journal of Solid–State Circuits, vol. 25, No. 6, pp. 1450–1457.*

"A 270–kb/s 35m W Modulator IC for GSM Cellular Radio Hand–Held Terminals," Haspelagh, et al., IEEE Journal of Solid State Circuit, vol. 25, No. 6, pp. 1450–1457, Dec 1990.

"Efficient Implementation of an I–Q GMSK Modulator," Linz, et al., IEEE Transactions on Circuits and Systems–II: Analog and Digital Signal Processing, vol. 43, No. 1, pp. 14–23, Jan. 1996.

* cited by examiner

*Primary Examiner*—Stephen Chin
*Assistant Examiner*—Lawrence Williams
(74) *Attorney, Agent, or Firm*—Senniger, Powers, Leavitt & Roedel (57) ABSTRACT

The present invention is an apparatus and method for performing a Gaussian Minimum Shift Keying baseband modulation based on a reference phase to be simplified. The invention mainly comprises: a memory unit storing a plurality of parameters and their corresponding tabular data of a low pass Gaussian filter, the parameters and their corresponding tabular data being simplified in advance; the low pass filter being used for reducing the bandwidth of the apparatus and increasing the utilization of the bandwidth; and a processing unit based on the input digital data and the tabular data in the memory unit to generate the digital in-phase signal $I_n$ and the digital quadrature-phase signal $Q_n$.

22 Claims, 7 Drawing Sheets

APPARATUS AND METHOD FOR GMSK BASEBAND MODULATION BASED ON A REFERENCE PHASE TO BE SIMPLIFIED

BACKGROUND OF THE INVENTION

1. Field of the Invention

The present invention relates to an apparatus and method for performing GMSK (GAUSSIAN MINIMUM SHIFT KEYING) baseband modulation, and particularly to an apparatus and method for building and storing a plurality of parameters and their corresponding tabular data which is simplified previously and using the tabular data to rapidly and correctly modulate input signals.

2. Description of the Related Art

GMSK baseband modulation is widespreadly used in digital wireless baseband modulating technology. Because the amplitude of the signal after modulation is constant, the situation of a nonlinear distortion will not occur, and thus a nonlinear (class C) RF power amplifier is suitable for better performance. The prior design flow of implementing GMSK baseband modulator is described hereinafter. Firstly, a digital filter generates a frequency track according to the input signals. Secondly, an accumulator computes phase shift of modulating signals. Finally, calculate a set of in-phase signals $I_n$ and a set of quadrature-phase signals $Q_n$ based on a look-up table stored in a memory in which sine and cosine mathematical functions are listed in the table. The above-mentioned technology is shown in "A 270 Kb/s 35-mW Modulator IC for GSM Cellular Radio Hand Held Terminals," by J. Haspeslaghet al., IEEE J. Solid-State Circuits, Vol. 25, pp.1450–1457, December 1990. The prior art method has some disadvantages. For instance, a accumulator inside the prior art structure would create an accumulation error and a quantization error, and a lot of memories are needed for storing mathematical functions representing phase curves. Another prior art method is shown in "Efficient Implementation of an I-Q GMSK Modulator, by Alfredo Linz and Alan Hendrickson," IEEE Transaction on Circuit and System, Vol. 43, No. 1, pp. 14–23, January 1996. In this book, a frequency offset is integrated to get the difference between phases, and uses the resulting output phase curves during a period of transferring two symbol bits to approximate all possible output signals. This prior art method is only suitable for the circumstance of 3-bit input signals. When the bit number of input signals is over three, the design complexity will too rapidly increase to implement easily. Besides, if only using three bits as indexes to look up the tables in memory, the accumulation error will exceed a threshold of the system, particularly in the case of the smaller parameters like BT (the product of the lower 3 dB bandwidth of a low pass Gaussian filter multiplied by the time needed for transmitting one-bit digital data). As mentioned above, the desired performance of the GMSK baseband modulation: rapidity, low distortion and lower hardware cost, are not completely achieved by the prior art.

SUMMARY OF THE INVENTION

Accordingly, the object of the present invention is to resolve the following drawbacks: (1) the conventional GMSK baseband modulation uses complex mathematical operations to obtain the in-phase signal I(t) and the quadrature-phase signal Q(t), and (2) the parameters of conventional GMSK baseband modulation can not be adjusted as desired. In order to accomplish the object, the present invention proposes an apparatus and method for performing GMSK baseband modulation based on a reference phase to be simplified. The present invention simplifies the definition and formula of the in-phase signal I(t) and quadrature-phase signal Q(t) in advance, and stores results and corresponding parameters into look-up tables inside a memory. Thus, the present invention only needs a simple logic and control circuit to find out the corresponding data in the memory, and calculates digital in-phase signal $I_n$ and digital quadrature-phase signal $Q_n$ through simple operations. Besides, the important parameters of the present invention, such as BT, can be adjusted by the user to change the operating characteristic of the system. The present invention only needs small memory capacity, a little operation by the whole circuit, and a little operation time in computation. Therefore, the present invention can transmit data at a high speed. Furthermore, because various results are accurately calculated by the present invention in advance, the accumulation errors will be largely reduced. In conclusion, the present invention reduces the time of operations and memory space, and prevents the accumulation errors occurring easily in the conventional GMSK baseband modulation.

The present invention in baseband modulating apparatus mainly comprises a memory unit and a processing unit. The memory unit which stores a plurality of parameters and their corresponding tabular data of a low pass Gaussian filter, the parameters and their corresponding tabular data being simplified in advance; the low pass filter being used for reducing the bandwidth of the apparatus and increasing the utilization of the bandwidth; and a processing unit based on the input digital data and the tabular data in the memory unit to generate the digital in-phase signal $I_n$, and the digital quadrature-phase signal $Q_n$. The processing unit comprises: an input device for recording the input digital data; an accumulator connected to the input device to generate a reference phase $\theta_{ref}$; and a control unit, connected to the input device, the accumulator and the memory unit, for generating control signals and address access signals associated with the memory unit.

The present invention in baseband modulating method mainly comprising: the step of building and storing a plurality of parameters and their corresponding tabular data of a low pass filter, the parameters and their corresponding tabular data being simplified in advance; the low pass filter being used for reducing the bandwidth needed and increasing the utilization of the bandwidth; the step of sequentially recording the input digital data; the step of determining a reference phase $\theta_{ref}$; and the step of receiving the tabular data which is associated with the input digital data; and the step of generating the digital in-phase signal $I_n$ and the digital quadrature-phase signal $Q_n$ by using the reference phase and the received tabular data The present structure can also be implemented by software, because of simplicity and less operations of the structure, the implementation by software also has the advantage as above-mentioned.

BRIEF DESCRIPTION OF THE DRAWINGS

The invention will be described according to the appended drawings in which.

PREFERRED EMBODIMENT OF THE PRESENT INVENTION

Figure 1:
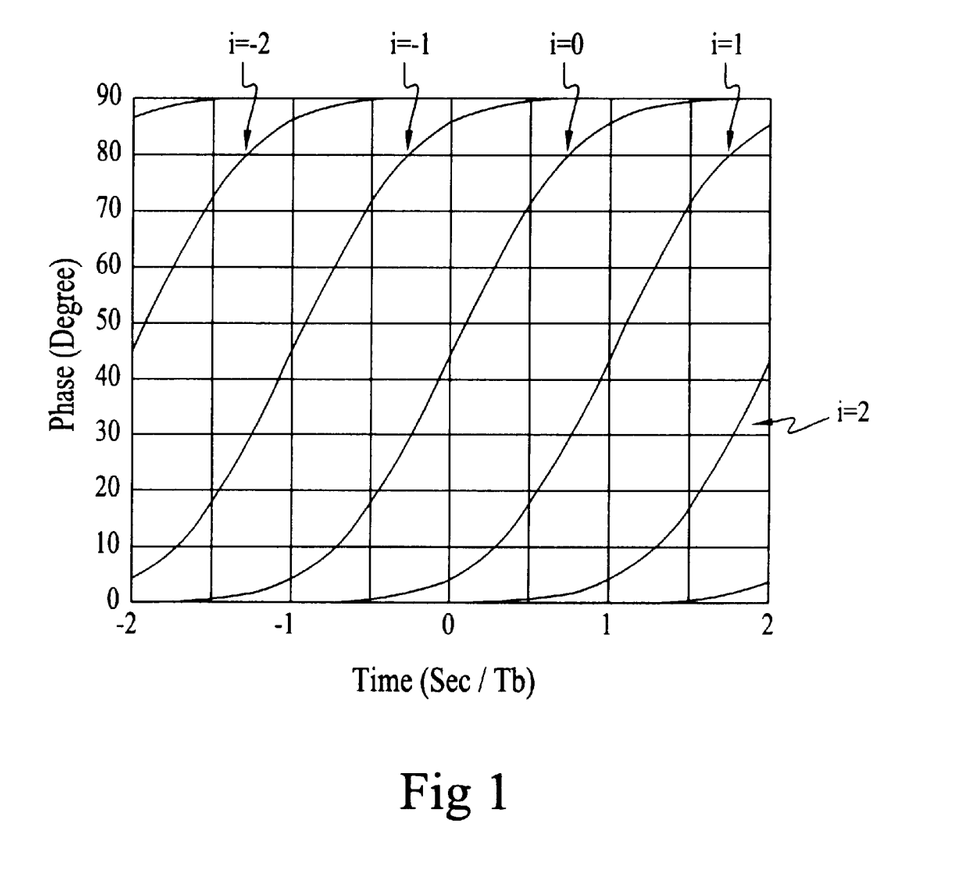
FIG. 1 is a simulation diagram of sampling times vs. the phase of the modulation according to the present invention.

In digital communication system, in-phase signal I(t) and quadrature-phase signal Q(t) must be calculated, wherein I(t)=cos(θ(t)), Q)(t)=sin(θ(t)), and θ(t) represents phase shift and can also be expressed as following equation:

$$\theta(t) = \sum_{i=-\infty}^{\infty} d_i \cdot p(t - i \cdot T_b) \tag{1}$$

wherein $$p(t) = \frac{\pi}{2 \cdot T_b} \cdot \int_{-\infty}^{t} \int_{-z-T_b/2}^{-z+T_b/2} h_G(\tau) \cdot d\tau \cdot dz, \, h_G(\tau)$$

represents the time domain response equation of a Gaussian Low Pass Filter, $d_i$ represents input digital data (when input digital data is equal to 1, then $d_i$=1; when input digital data is equal to 0, then $d_i$=−1), and $T_b$ represents the time needed for transmitting one-bit digital data. It can be easily understood from equation (1) that the influence of every input signal on output phases of a modulator is determined by p(t−i·$T_b$). If the current time is defined as |t|≦0.5·$T_b$(i=0), and the influence of different input digital signals on the output phases is observed, the results are shown in FIG. 1. When i is less than −2 or −1 (which is determined by the value of BT), p(t−i·Tb) is close to $$\frac{\pi}{2};$$

and when i is larger than 2 or 1 (which is determined by the value of BT), p(t−i·Tb) is close to 0. Thus, equation (1) can be modified as follows:

$$\theta(t) \cong \sum_{i=-\infty}^{-K-1} d_i \cdot \frac{\pi}{2} + \sum_{i=-K}^{K} d_i \cdot p(t - i \cdot T_b) + \sum_{i=K+1}^{\infty} d_i \cdot 0 \cong \theta_{ref} + \theta'_G(t) \tag{2}$$

The value of K depends on the parameter BT. Usually the larger the value of K is, the more accurate the modulation is and the more expensive the hardware cost is. When BT is less than 0.3, usually K=2. When BT is larger than 0.3, usually K=1. The relationship between reference phase $\theta_{ref}$ and $\theta'_G(t)$ is defined by equation (3) and equation (4).

$$\theta_{ref} = \sum_{i=-K}^{-K-1} d_i \cdot \frac{\pi}{2} \tag{3}$$

$$\theta'_g(t) = \sum_{i=-k}^{K} d_i \cdot p(t - i \cdot Tb) \tag{4}$$

$$G = \sum_{i=-K}^{K} \frac{(d_i + 1)}{2} \cdot 2^{K-i} \tag{5}$$

The parameter $\theta_{ref}$ only has four possible values: 0,π/2, π,3·π/2. Only a 2-bit accumulator is needed to implement $\theta_{ref}$ in a digital circuit. $\theta'_G(t)$ has $2^{2 \cdot K+1}$ different combinations of output phase curves. In other words, the output phases of modulating signals θ(t) can represent all situations and will be obtained by adding $\theta'_G(t)$ to $\theta_{ref}$. All the curves of I(t) and Q(t) totally have $4 \cdot 2^{2 \cdot K+1} \cdot 2$ different curves. Different reference phases $\theta_{ref}$ will correspond to the curve of $\theta_{ref}$=0. The relationships between above-mentioned correspondences are shown in table 1.

TABLE 1

| $\theta_{ref}$ | I(t) = cos(θ(t)) = cos($\theta_{ref}$ + $\theta_G'$(t)) | Q(t) = sin(θ(t)) = sin($\theta_{ref}$ + $\theta_G'$(t)) |
|---|---|---|
| 0 | cos($\theta_G'$(t)) | sin($\theta_G'$(t)) |
| $\frac{\pi}{2}$ | −sin($\theta_G'$(t)) | cos($\theta_G'$(t)) |
| π | −cos($\theta_G'$(t)) | −sin($\theta_G'$(t)) |
| $\frac{3 \cdot \pi}{2}$ | sin($\theta_G'$(t)) | −cos($\theta_G'$(t)) |

In conclusion, only the curve of $\theta_{ref}$=0 will represent all the curves in any situation. There are totally $2^{2 \cdot K+1} \cdot 2$ curves when $\theta_{ref}$=0. These curves still have vertically symmetric or horizontally symmetric characteristics, and thus $$\frac{2^{2 \cdot K+1} \cdot 2}{4} = 2^{2 \cdot K}$$

curves are needed after simplification so as to represent all possible output curves under any situation. Table 2 is a table of cos($\theta'_G$(t)) corresponding to sin($\theta'_G$(t)) when K=1. Table 3 is a table of cos($\theta'_G$(t)) corresponding to sin($\theta'_G$(t)) when K=2.

TABLE 2

| Q (t) | I (t) |
|---|---|
| sin ($\theta_0'$(t)) | cos ($\theta_0'$(t)) = sin ($\theta_0'$(−t)) |
| sin ($\theta_1'$(t)) | cos ($\theta_1'$(t)) = sin ($\theta_3'$(−t)) |
| sin ($\theta_2'$(t)) | cos ($\theta_2'$(t)) = −sin ($\theta_2'$(−t)) |
| sin ($\theta_3'$(t)) | cos ($\theta_3'$(t)) = −sin ($\theta_1'$(−t)) |
| sin ($\theta_4'$(t)) = −sin ($\theta_3'$(t)) | cos ($\theta_4'$(t)) = −sin ($\theta_1'$(−t)) |
| sin ($\theta_5'$(t)) = −sin ($\theta_2'$(t)) | cos ($\theta_5'$(t)) = −sin ($\theta_2'$(−t)) |
| sin ($\theta_6'$(t)) = −sin ($\theta_1'$(t)) | cos ($\theta_6'$(t)) = sin ($\theta_3'$(−t)) |
| sin ($\theta_7'$(t)) = −sin ($\theta_0'$(t)) | cos ($\theta_7'$(t)) = sin ($\theta_0'$(−t)) |

TABLE 3

| Q (t) | I (t) |
|---|---|
| sin ($\theta_0'$(t)) | cos ($\theta_0'$(t)) = −sin ($\theta_0'$(−t)) |
| sin ($\theta_1'$(t)) | cos ($\theta_1'$(t)) = −sin ($\theta_{15}'$(−t)) |
| sin ($\theta_2'$(t)) | cos ($\theta_2'$(t)) = sin ($\theta_8'$(−t)) |
| sin ($\theta_3'$(t)) | cos ($\theta_3'$(t)) = sin ($\theta_7'$(−t)) |
| sin ($\theta_4'$(t)) | cos ($\theta_4'$(t)) = sin ($\theta_4'$(−t)) |
| sin ($\theta_5'$(t)) | cos ($\theta_5'$(t)) = sin ($\theta_{11}'$(−t)) |
| sin ($\theta_6'$(t)) | cos ($\theta_6'$(t)) = −sin ($\theta_{12}'$(−t)) |
| sin ($\theta_7'$(t)) | cos ($\theta_7'$(t)) = −sin ($\theta_3'$(−t)) |
| sin ($\theta_8'$(t)) | cos ($\theta_8'$(t)) = sin ($\theta_2'$(−t)) |
| sin ($\theta_9'$(t)) | cos ($\theta_9'$(t)) = sin ($\theta_{13}'$(−t)) |
| sin ($\theta_{10}'$(t)) | cos ($\theta_{10}'$(t)) = −sin ($\theta_{10}'$(−t)) |
| sin ($\theta_{11}'$(t)) | cos ($\theta_{11}'$(t)) = −sin ($\theta_5'$(−t)) |
| sin ($\theta_{12}'$(t)) | cos ($\theta_{12}'$(t)) = −sin ($\theta_6'$(−t)) |

TABLE 3-continued

| | |
|---|---|
| $\sin(\theta_{13}'(t))$ | $\cos(\theta_{13}'(t)) = -\sin(\theta_9'(-t))$ |
| $\sin(\theta_{14}'(t))$ | $\cos(\theta_{14}'(t)) = \sin(\theta_{14}'(-t))$ |
| $\sin(\theta_{15}'(t))$ | $\cos(\theta_{15}'(t)) = \sin(\theta_1'(-t))$ |
| $\sin(\theta_{16}'(t)) = -\sin(\theta_{15}'(t))$ | $\cos(\theta_{16}'(t)) = \sin(\theta_1'(-t))$ |
| $\sin(\theta_{17}'(t)) = -\sin(\theta_{14}'(t))$ | $\cos(\theta_{17}'(t)) = \sin(\theta_{14}'(-t))$ |
| $\sin(\theta_{18}'(t)) = -\sin(\theta_{13}'(t))$ | $\cos(\theta_{18}'(t)) = -\sin(\theta_9'(-t))$ |
| $\sin(\theta_{19}'(t)) = -\sin(\theta_{12}'(t))$ | $\cos(\theta_{19}'(t)) = \sin(\theta_6'(-t))$ |
| $\sin(\theta_{20}'(t)) = -\sin(\theta_{11}'(t))$ | $\cos(\theta_{20}'(t)) = -\sin(\theta_5'(-t))$ |
| $\sin(\theta_{21}'(t)) = -\sin(\theta_{10}'(t))$ | $\cos(\theta_{21}'(t)) = -\sin(\theta_{10}'(-t))$ |
| $\sin(\theta_{22}'(t)) = -\sin(\theta_9'(t))$ | $\cos(\theta_{22}'(t)) = \sin(\theta_{13}'(-t))$ |
| $\sin(\theta_{23}'(t)) = -\sin(\theta_8'(t))$ | $\cos(\theta_{23}'(t)) = \sin(\theta_2'(-t))$ |
| $\sin(\theta_{24}'(t)) = -\sin(\theta_7'(t))$ | $\cos(\theta_{24}'(t)) = -\sin(\theta_3'(-t))$ |
| $\sin(\theta_{25}'(t)) = -\sin(\theta_6'(t))$ | $\cos(\theta_{25}'(t)) = -\sin(\theta_{12}'(-t))$ |
| $\sin(\theta_{26}'(t)) = -\sin(\theta_5'(t))$ | $\cos(\theta_{26}'(t)) = \sin(\theta_{11}'(-t))$ |
| $\sin(\theta_{27}'(t)) = -\sin(\theta_4'(t))$ | $\cos(\theta_{27}'(t)) = \sin(\theta_4'(-t))$ |
| $\sin(\theta_{28}'(t)) = -\sin(\theta_3'(t))$ | $\cos(\theta_{28}'(t)) = \sin(\theta_7'(-t))$ |
| $\sin(\theta_{29}'(t)) = -\sin(\theta_2'(t))$ | $\cos(\theta_{29}'(t)) = \sin(\theta_8'(-t))$ |
| $\sin(\theta_{30}'(t)) = -\sin(\theta_1'(t))$ | $\cos(\theta_{30}'(t)) = -\sin(\theta_{15}'(-t))$ |
| $\sin(\theta_{31}'(t)) = -\sin(\theta_0'(t))$ | $\cos(\theta_{31}'(t)) = -\sin(\theta_0'(-t))$ |

The results listed in table 2 and table 3 will lead to the following symmetrical relationships:

$$I(t) = \cos(\theta'_G(t)) = \begin{cases} \cos(\theta'_G(t)), & G < 2^{2 \cdot K} \\ \cos(\theta'_{2^{2 \cdot K+1} - G - 1}(t)), & G \geq 2^{2 \cdot K} \end{cases} \quad (6)$$

$$Q(t) = \cos(\theta'_G(t)) = \begin{cases} \sin(\theta'_G(t)), & G < 2^{2 \cdot K} \\ -\sin(\theta'_{2^{2 \cdot K+1} - G - 1}(t)), & G \geq 2^{2 \cdot K} \end{cases}$$

If sampling time $$t_n = \left\{ \frac{2 \cdot n + 1}{2 \cdot M} - \frac{1}{2} \right\} \cdot T_b; n = 0, 1, 2, 3, \ldots, M - 1$$

it will lead to the following symmetrical relationships:

$$Q_n = Q(t_n) = \sin(\theta'_G(t_n)) = \begin{cases} \sin(\theta'_G(t_n)), & G < 2^{2 \cdot K} \\ -\sin(\theta'_{2^{2 \cdot K+1} - G - 1}(t_n)), & G \geq 2^{2 \cdot K} \end{cases} \quad (7)$$

$$I_n = I(t_n) = \cos(\theta'_G(t_n)) = \begin{cases} \cos(\theta'_G(t_n)), & G < 2^{2 \cdot K} \\ \cos(\theta'_{2^{2 \cdot K+1} - G - 1}(t_n)), & G \geq 2^{2 \cdot K} \end{cases}$$

Wherein the value of parameter K depends on parameter BT which is the product of the lower 3 dB bandwidth of low pass Gaussian filter multiplied by the time needed for transmitting one-bit digital data. When BT is less than 0.3, usually K=2, and when BT is larger than 0.3, K=1. Parameter $d_i$ represents input digital data (when input digital data is equal to 1, then $d_i$=1; when input digital data is equal to 0, then $d_i$=−1). Parameter G represents the storage amount of the tables. Parameter $\theta$ represents the phase shift of the modulation.

Suppose that sampling operation is conducted M times during the period of transferring one-bit digital data, and every sampled signal is quantized by R bits. Therefore, the size of the memory for saving sampled signals is $2^{2 \cdot K} \cdot M \cdot R$ bits. Table 2 and table 3 reveal that all possible values of I(t) and Q(t) will correspond to a curve formed by $\sin(\theta'_0(t)) \sim \sin(\theta'_{2^{2 \cdot K}}(t))$, and the corresponding way between I(t) and Q(t) is horizontally symmetric. In other words, I(t) and Q(t) will not refer to the same position in the memory at the same time. Therefore, sampling points at the curve formed by $\sin(\theta'_0(t)) \sim \sin(\theta_{2^{2 \cdot K}}(t))$ are divided and then stored in two separated memories. Only two multiplexers and two complementers are needed to obtain the sampling points of I(t) and Q(t).

Figure 2:
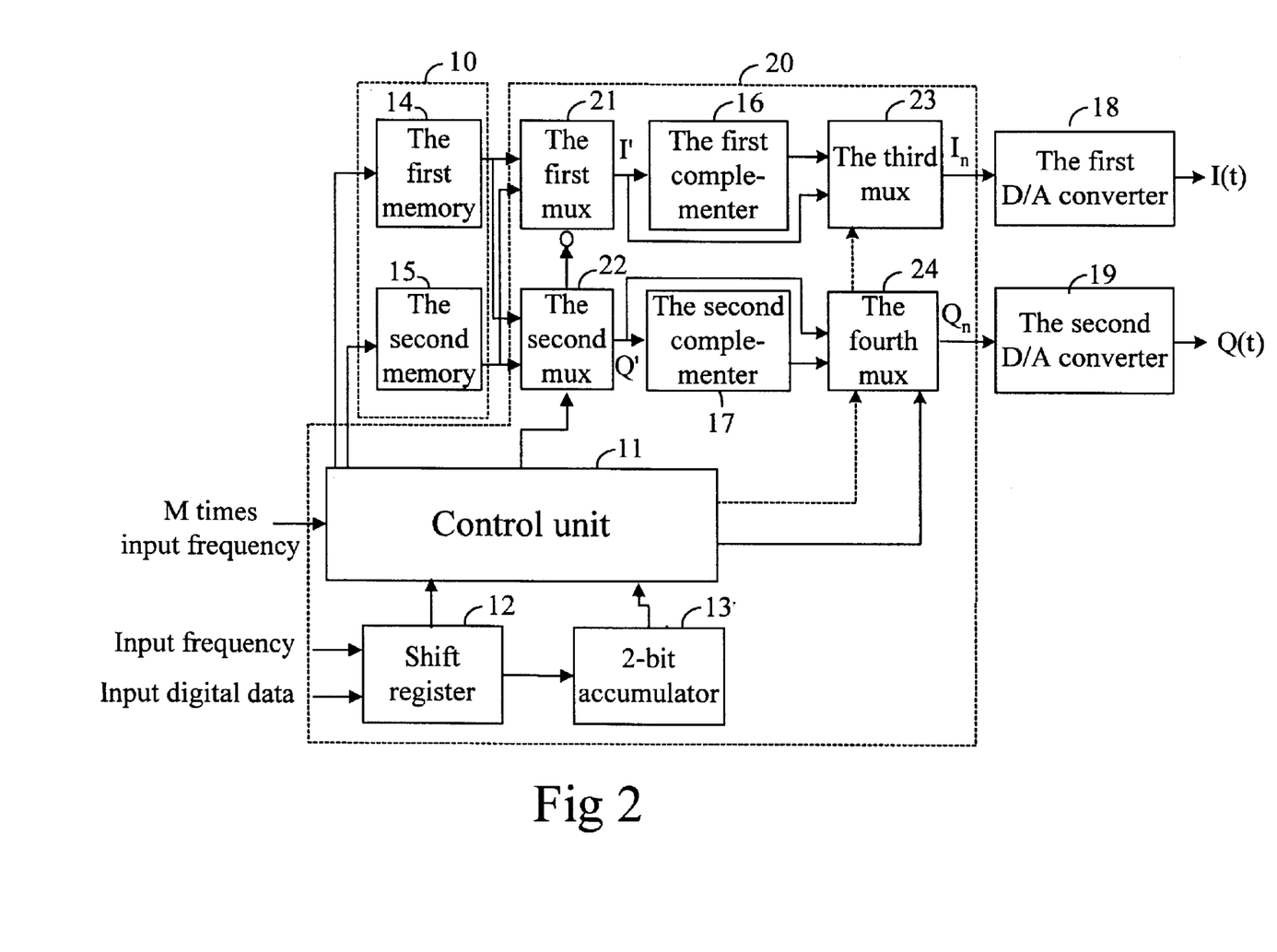
FIG. 2 is a schematic diagram of an apparatus according to a preferred embodiment of the present invention.

A modulating apparatus according to a preferred embodiment of the present invention is shown in FIG. 2. The apparatus comprises a memory unit 10 and a processing unit 20. The memory unit 10 comprises a first memory 14 and a second memory 15. The processing unit 20 comprises: an input device, such as a (2K+1)-bit shift register 12, is used to store the recently received (2K+1)-bit input digital data. A two-bit accumulator 13 is used to calculate the value of the reference phase $\theta_{ref}$. For example, binary number 11 represents phase $3\pi/2$, binary number 10 represents phase $\pi$, binary number 01 represents phase $\pi/2$, and binary number 00 represents phase 0. When input digital data is 0, the phase needs to be subtracted by $\pi/2$, and the associated 2-bit accumulator carries out a subtraction operation by 1. When input digital data is 1, the phase needs to be increased by $\pi/2$, and the associated 2-bit accumulator carries out an addition operation by 1. The results output from the accumulator 13 support the control unit 11 to generate control signals and the addresses for looking up tables. The control unit 11 is mainly used to accomplish the mapping relationships in table 1, table 2 and table 3, to generate the related tabular addresses of the first memory 14 and the second memory 15, and determine the control signals of a first multiplexer 21, a second multiplexer 22, a third multiplexer 23, and a fourth multiplexer 24. The first multiplexer 21 receives a signal I' from the first memory 14 or the second memory 15, wherein the signal I' is an intermediate signal for generating a signal $I_n$. The second multiplexer 22 receives signal Q' from the first memory 14 or the second memory 15, wherein Q' is an intermediate signal for generating a signal $Q_n$. The first memory and the second memory are mainly used to record sampling points of $2^{2 \cdot K}$ curves formed by $\sin(\theta'_0(t)) \sim \sin(\theta_{2^{2 \cdot K} - 1}(t))$, wherein the first memory 14 stores the first ½ part sampling points of curves formed by $\sin(\theta'_0(t)) \sim \sin(\theta_{2^{2 \cdot K} - 1}(t))$. For example, the front ½ part or any suspended combination which totally occupies ½ part of curve $\sin(\theta'_0(t)) \sim \sin(\theta_{2^{2 \cdot K} - 1}(t))$. The second memory 15 is mainly used to record the second ½ part sampling points of curves formed by $\sin(\theta'_0(t)) \sim \sin(\theta_{2^{2 \cdot K} - 1}(t))$ which is exclusive from the first ½ part sampling points. For example, the rear part of the curve $\sin(\theta'_0(t)) \sim \sin(\theta_{2^{2 \cdot K} - 1}(t))$. The multiplexers 21, 22, 23, and 24 determine the data path for generating the signals $I_n$ and $Q_n$. Two complementers 16 and 17 can save the storage space of the memory unit 10 for storing tabular data. When the stored tabular data has the symmetric characteristic of operation signs, only positive operation sign is saved and negative operation sign is obtained by the complementers 16 and 17. The first R-bit D/A converter (digital-to-analog converter) 18 and the second R-bit D/A converter (digital-to-analog converter) 19 are used to convert the digital modulating signals $I_n$ and $Q_n$ into analog modulating signals I(t) and Q(t). Table 4 is a possible mapping table in a memory with K=2 and M=16.

TABLE 4

| address | stored data |
|---|---|
| 000~00F | $\sin(\theta_0'(t_0)) \sim \sin(\theta_0'(t_{15}))$ |
| 010~01F | $\sin(\theta_1'(t_0)) \sim \sin(\theta_1'(t_{15}))$ |
| 020~02F | $\sin(\theta_2'(t_0)) \sim \sin(\theta_2'(t_{15}))$ |
| 030~03F | $\sin(\theta_3'(t_0)) \sim \sin(\theta_3'(t_{15}))$ |
| 040~04F | $\sin(\theta_4'(t_0)) \sim \sin(\theta_4'(t_{15}))$ |
| 050~05F | $\sin(\theta_5'(t_0)) \sim \sin(\theta_5'(t_{15}))$ |
| 060~06F | $\sin(\theta_6'(t_0)) \sim \sin(\theta_6'(t_{15}))$ |
| 070~07F | $\sin(\theta_7'(t_0)) \sim \sin(\theta_7'(t_{15}))$ |
| 080~08F | $\sin(\theta_8'(t_0)) \sim \sin(\theta_8'(t_{15}))$ |
| 090~09F | $\sin(\theta_9'(t_0)) \sim \sin(\theta_9'(t_{15}))$ |

TABLE 4-continued

| address | stored data |
| --- | --- |
| 0A0~0AF | $\sin(\theta_{10}'(t_0))\sim\sin(\theta_{10}'(t_{15}))$ |
| 0B0~0BF | $\sin(\theta_{11}'(t_0))\sim\sin(\theta_{11}'(t_{15}))$ |
| 0C0~0CF | $\sin(\theta_{12}'(t_0))\sim\sin(\theta_{12}'(t_{15}))$ |
| 0D0~0DF | $\sin(\theta_{13}'(t_0))\sim\sin(\theta_{13}'(t_{15}))$ |
| 0E0~0EF | $\sin(\theta_{14}'(t_0))\sim\sin(\theta_{14}'(t_{15}))$ |
| 0F0~0FF | $\sin(\theta_{15}'(t_0))\sim\sin(\theta_{15}'(t_{15}))$ |

Figure 3:
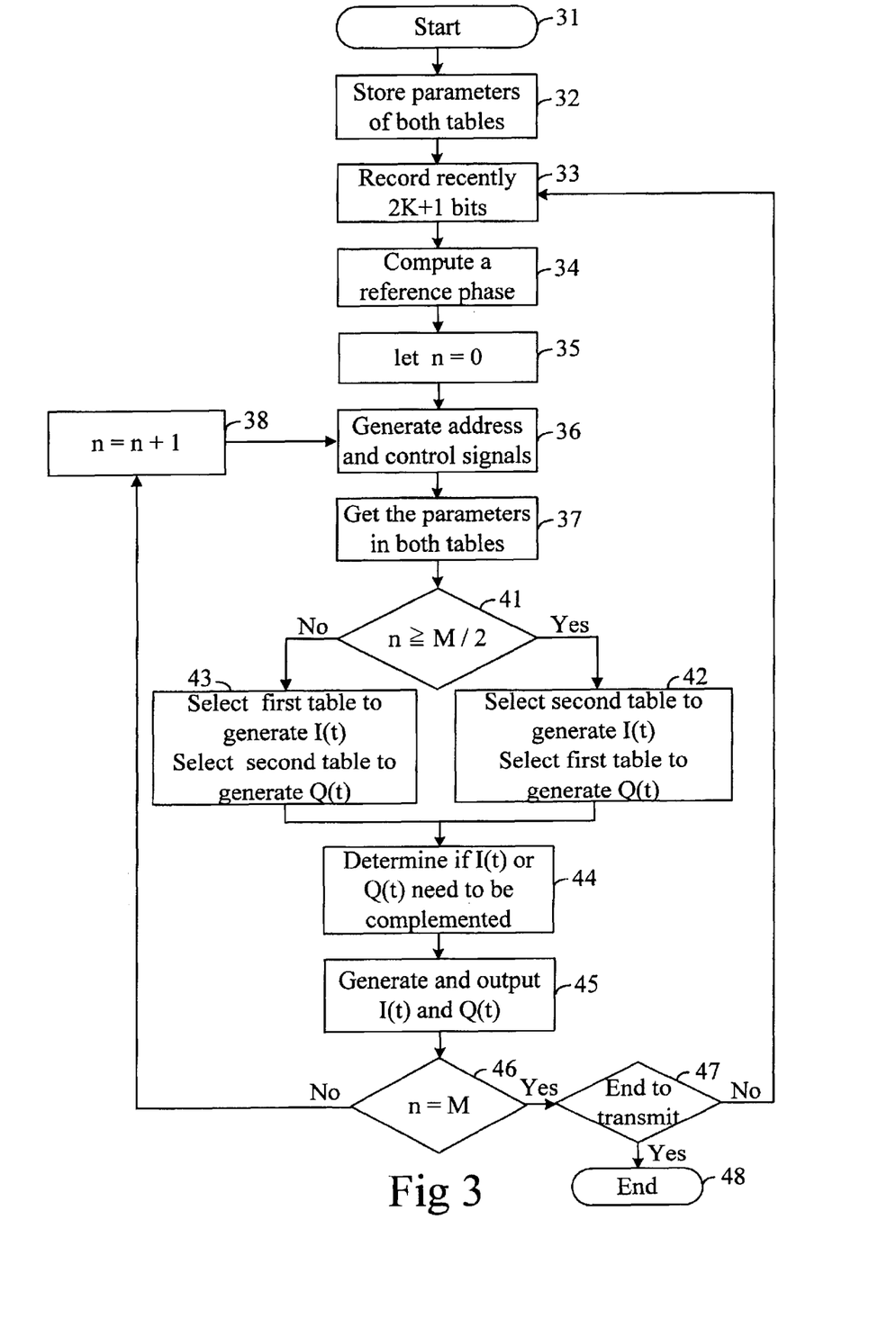
FIG. 3 is a flow diagram of a preferred embodiment of the present invention.

The operating flow diagram of the present invention is shown in FIG. 3. The operation begins with step 31. In step 32, the operator bases on the requirement of the system to build up and store a plurality of parameters of a low pass filter and the tabular data corresponding to the parameters in the first memory 14 and the second memory 15. In step 33, recently received (2K+1) bits of input digital data are stored. In step 34, a reference phase $\theta_{ref}$ is calculated based on the input digital data. Subsequently, the flow enters a sampling procedure. In step 35, initially set a sampling order n to 0. In step 36, the (2K+1) bits of input digital data and the reference phase $\theta_{ref}$ are used to generate address and control signals for accessing the first memory 14 and the second memory 15. In step 37, the tabular data stored in the first memory 14 and the second memories 15 are captured. In step 41, whether the sampling order n is larger than half of the total sampling number M is determined. If the answer is yes, in step 42, related values of in-phase signal output from the second memory 15 and related values of quadrature-phase signal output from the first memory 14. If the answer is no, in step 43, related values of in-phase signal output from the first memory 14, and related values of quadrature-phase signal output from the second memory 15. In step 44, whether the related values of in-phase signal and quadrature-phase signal should be complemented is determined. The reason for complement can be found in table 1, table 2 and table 3. In step 45, the in-phase signal and quadrature-phase signal will be calculated and output. In step 46, whether the sampling order n reaches the value M is determined. If the answer is no, the flow enters step 38. In step 38, the sampling order is increased by 1. After step 38, the flow enters step 36, and generates address and control signals for accessing the first memory 14 and the second memory 15. If the answer is yes, in step 47, whether the signal transmitting process is to be ended is determined. If the answer is no, then the flow enters step 33 and the recently received (2K+1) bits of input digital data are stored. If the answer is yes, in step 48, the flow is terminated.

Figure 4:
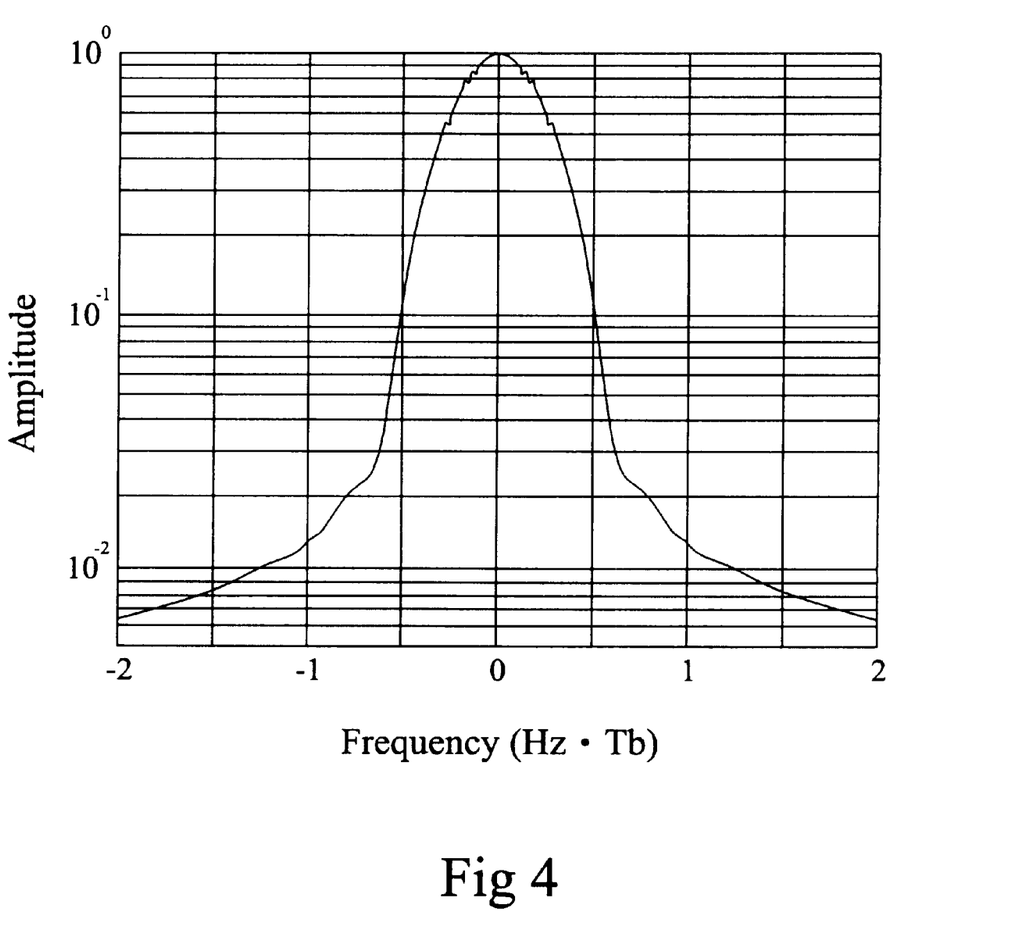
FIG. 4 is a spectral diagram of a preferred embodiment of the present invention.
Figure 5:
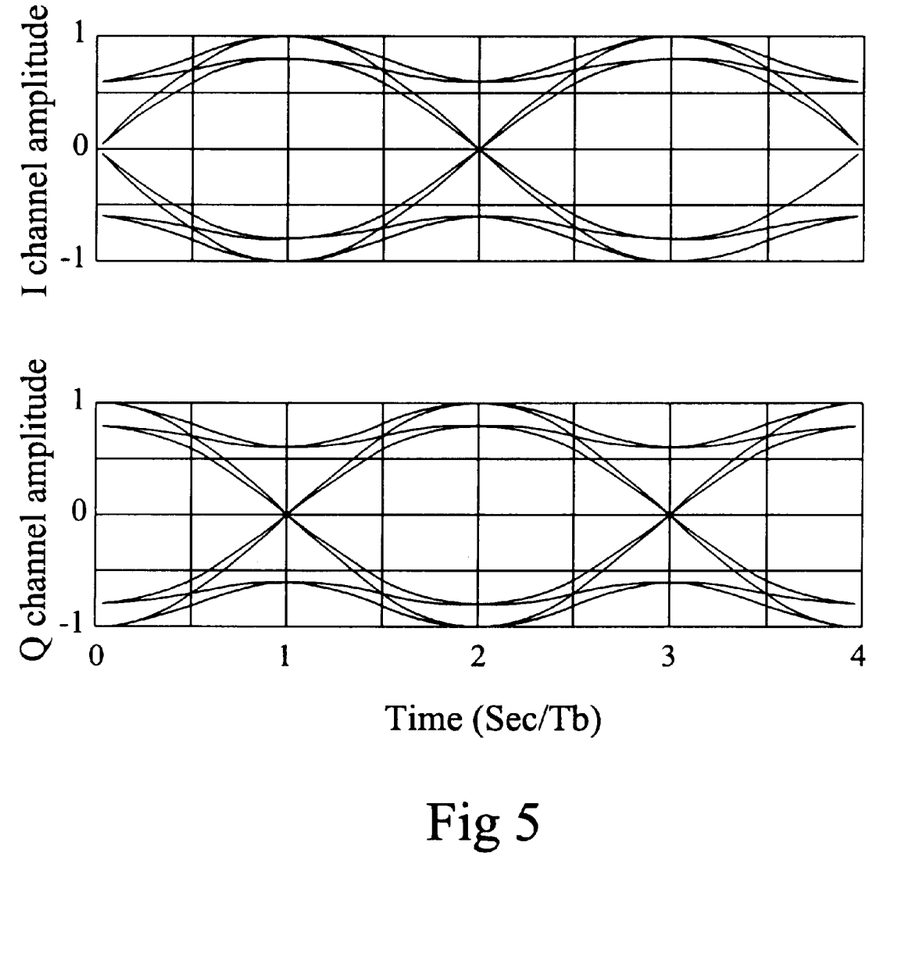
FIG. 5 is an eye-like diagram of a preferred embodiment of the present invention.
Figure 6:
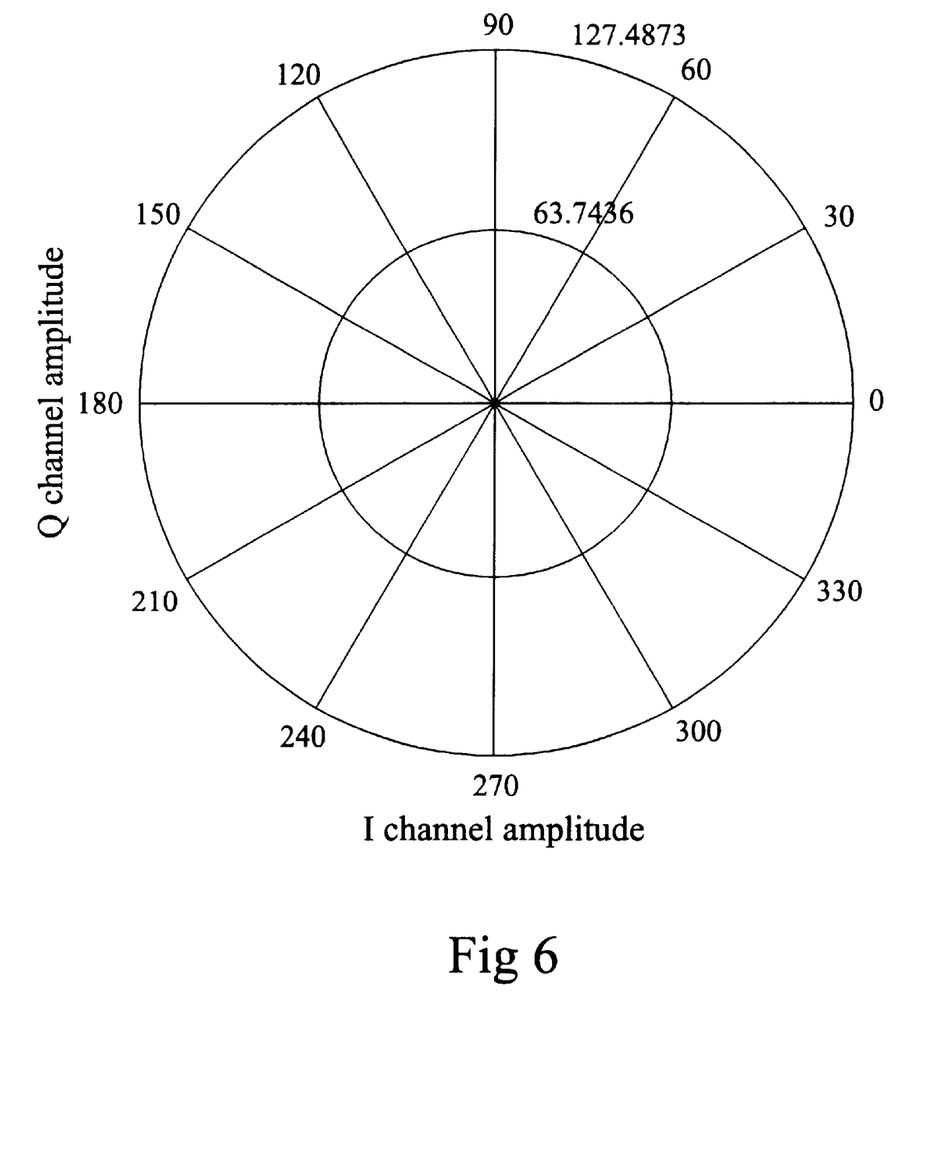
FIG. 6 is a constellation diagram of a preferred embodiment of the present invention.
Figure 7:
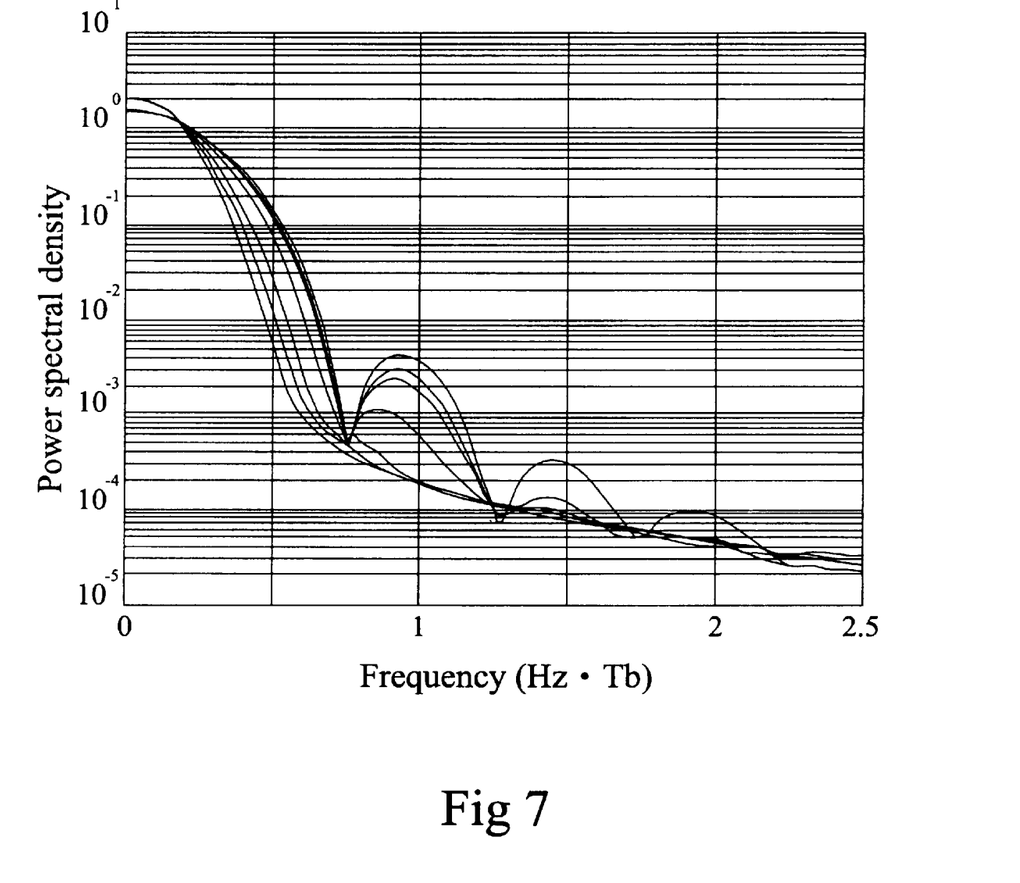
FIG. 7 is an output power spectral density diagram of a preferred embodiment of the present invention.

The following are simulated results of the present invention under the conditions: parameter BT=0.25, K=2, M=16, $T_b$=1 and R=8. It is known from equation (2) that K=2 means that only the most important five bits for the output are observed and the influence by the other bits are considered to be constant. M=16 means that the sampling frequency is 16 times the frequency of input signals. R=8 means that every sampling point is quantized by 8 bits. FIG. 4 is a spectral diagram of the simulated results, wherein $T_b$ represents the time needed for transmitting one bit of input digital data. FIG. 5 is an eye-like diagram of the simulated results. FIG. 6 is a constellation diagram of the simulated results. FIG. 7 is a power spectral diagram of the simulated results, wherein the parameters BT related to the curves from upper to lower are 1.0, 0.7, 0.6, 0.5, 0.4, 0.3, 0.25, 0.2 and 0.16.

The present invention can also be implemented by software, because of simplicity and less operations of the structure. The implementation by software also has the above-mentioned advantages.

The present invention for performing Gaussian Minimum Shift Keying baseband modulation. based on a reference phase $\theta_{ref}$ to be simplified can be saved in any computer readable storage medium, such as floppy, compact disk, hard disk or any kind of memory.

The above-described embodiments of the present invention are intended to be illustrated only. Numerous alternative embodiments may be devised by those skilled in the art without departing from the scope of the following claims.

What is claimed is:

1. An apparatus for performing Gaussian Minimum Shift Keying baseband modulation based on a reference phase $\theta_{ref}$ to be simplified, applied in communication system, used to modulate input digital data into digital in-phase signal $I_n$ and digital quadrature-phase signal $Q_n$, comprising:

a memory unit which stores a plurality of parameters and their corresponding tabular data of a low pass Gaussian filter, said parameters and their corresponding tabular data being simplified in advance; said low pass filter being used for reducing the bandwidth of said apparatus and increasing the utilization of the bandwidth; and a processing unit based on the input digital data and the tabular data in said memory unit to generate said digital in-phase signal $I_n$ and said digital quadrature-phase signal $Q_n$, comprising:

an input device for recording said input digital data;

an accumulator connected to said input device to generate a reference phase $\theta_{ref}$, wherein said reference phase $\theta_{ref}$ is generated by the following equation:

$$\theta_{ref} = \sum_{i=-\infty}^{-K-1} d_i \cdot \frac{\pi}{2}$$

wherein the value of K depends on a parameter BT which is the product of a lower 3 dB bandwidth of a low pass Gaussian filter and the time needed for transmitting one-bit digital data; $d_i$ represents the input digital data (when input digital data is equal to 1, then $d_i$=1; when the input digital data is equal to 0, then $d_i$=−1); and a control unit, connected to said input device, said accumulator and said memory unit, for generating control signals and address access signals associated with said memory unit.

2. The apparatus of claim 1, further comprising a digital-to-analog converter connected to the output of said processing unit for converting said digital in-phase signal $I_n$ and said digital quadrature-phase signal $Q_n$ into an analog in-phase signal I(t) and an analog quadrature-phase signal Q(t).

3. The apparatus of claim 1, wherein said memory unit stores the following data:

$$Q_n = Q(t_n) = \sin(\theta_G'(t_n)) = \begin{cases} \sin(\theta_G'(t_n)), & G < 2^{2 \cdot K} \\ -\sin(\theta_{2 \cdot K+1 - G - 1}'(t_n)), & G \geq 2^{2 \cdot K} \end{cases}$$

$$I_n = I(t_n) = \cos(\theta_G'(t_n)) = \begin{cases} \cos(\theta_G'(t_n)), & G < 2^{2 \cdot K} \\ \cos(\theta_{2 \cdot K+1 - G - 1}'(t_n)), & G \geq 2^{2 \cdot K} \end{cases}$$

wherein the value of K is determined by parameter BT which is the product of the lower 3 dB bandwidth of the low pass Gaussian filter and the time needed for transmitting one-bit digital data; $d_i$ represents the input digital data (when input digital data is equal to 1, then $d_i$=1; when the input digital data is equal to 0, then $d_i$=−1); G represents the storage amount of tables; θ represents the phase shift of the modulation; $T_b$ represents the time needed for transmitting one-bit digital data; and sampling time is expressed by:

$$t_n = \left\{\frac{2 \cdot n + 1}{2 \cdot M} - \frac{1}{2}\right\} \cdot T_b; \quad n = 0, 1, 2, 3, \ldots, M - 1.$$

4. The apparatus of claim 3, wherein the tabular data stored in said memory unit is either expressed by a sine function or a cosine function due to the symmetrization property of the triangle functions.

5. The apparatus of claim 1, wherein the in-phase signal $I_n$ refers to the first half part of the tabular data stored in said memory unit, and the quadrature-phase signal $Q_n$ refers to the second half part of the tabular data stored in said memory.

6. The apparatus of claim 1, wherein said memory unit includes a first memory and a second memory, the first memory stores the first half part of sampling points of a curve formed by $sin(\theta'_0(t)){\sim}sin(\theta_{2^{2 \cdot K}-1}(t))$, and the second memory stores the second half part of sampling points of a curve formed by $sin(\theta'_0(t)){\sim}sin(\theta_{2^{2 \cdot K}-1}(t))$, wherein $\theta$ is the phase shift of said apparatus.

7. The apparatus of claim 6, wherein said processing unit further includes two multiplexers; the first multiplexer generates a signal I' which is an intermediate solution of the in-phase signal from the first memory or the second memory, and the second multiplexer generates a signal Q' which is an intermediate solution of quadrature-phase signal from the first memory or the second memory.

8. The apparatus of claim 1, wherein the accumulator uses two binary number bits to execute an accumulating operation, wherein the binary number bits 11 represents phase $3\pi/2$, the binary number 10 represents phase $\pi$, the binary number 01 represents phase $\pi/2$, the binary number 00 represents phase 0; when the input digital data is equals to zero, the phases are subtracted by $\pi/2$, and the associated accumulation operation executes the action of subtraction by 1; when the input digital data is equals to 1, the phases are increased by $\pi/2$, and the associated accumulation executes the action of addition by 1.

9. The apparatus of claim 1, wherein said processing unit further includes a plurality of complementers, when the tabular data stored in said memory unit has the situation of opposite operation signs, only the part of positive operation sign is saved, and the part of negative operation sign is obtained through said complementers.

10. The apparatus of claim 1, wherein said processing unit samples M sampling points during the period of transferring one-bit digital data; every sampling point is quantized by R bits, and the total capacity of the memories is $2^{2 \cdot K} \cdot M \cdot R$ bits.

11. An method for performing Gaussian Minimum Shift Keying baseband modulation based on a reference phase $\theta_{ref}$ to be simplified, applied in communication system, used for modulating input digital data into digital in-phase signal $I_n$ and digital quadrature-phase signal $Q_n$, said method comprising the following steps:

(a) building and storing a plurality of parameters and their corresponding tabular data of a low pass filter, said parameters and their corresponding tabular data being simplified in advance; said low pass filter being used for reducing bandwidth needed and increasing the utilization of the bandwidth;

(b) sequentially recording said input digital data;

(c) determining a reference phase $\theta_{ref}$, said reference phase being generated by the following equation:

$$\theta_{ref} = \sum_{i=-\infty}^{-K-1} d_i \cdot \frac{\pi}{2}$$

wherein the value of K depends on a parameter BT which is the product of a lower 3 dB bandwidth of a low pass Gaussian filter and the time needed for transmitting one-bit digital data; $d_i$ represents the input digital data (when input digital data is equal to 1, then $d_i=1$; when the input digital data is equal to 0, then $d_i=-1$);

(d) receiving the tabular data which is associated with said input digital data; and (e) generating said digital in-phase signal $I_n$ and said digital quadrature-phase signal $Q_n$ by using said reference phase and said received tabular data.

12. The method of claim 11, wherein said tabular data has the property of vertical symmetry, which enables a first half part of the table to be generated by a second half part of the table.

13. The method of claim 11, wherein said tabular data has the property of horizontal symmetry, which enables the in-phase signal $I_i$ and quadrature-phase signal $Q_n$ to be derived by each other.

14. The method of claim 11, wherein said tabular data has the property of vertical and horizontal symmetry, which enables the in-phase signal $I_n$ and quadrature-phase signal $Q_n$ to be derived by each other, and the first half part of the digital in-phase signal $I_n$ and the digital quadrature-phase signal $Q_n$ table can be generated by the second half part of the digital in-phase signal $I_n$ and the digital quadrature-phase signal $Q_n$ table.

15. The method of claim 12, wherein only the second half part of the table is built and stored in step (a).

16. The method of claim 13, wherein only said plurality of parameters of either digital in-phase signal $I_n$ or digital quadrature-phase signal $Q_n$ and the tabular data associated with said parameters is built and stored in step (a).

17. The method of claim 14, wherein only said plurality of parameters of either digital in-phase signal $I_n$ or digital quadrature-phase signal $Q_n$ and the second half part of the tabular data associated with said parameters is built and stored in step (a).

18. The method of claim 11, wherein said plurality of parameters and the tabular data associated with said parameters stored in step (a) comprises:

$$Q_n = Q(t_n) = \sin(\theta'_G(t_n)) = \begin{cases} \sin(\theta'_G(t_n)), & G < 2^{2 \cdot K} \\ -\sin(\theta'_{2^{2 \cdot K+1}-G-1}(t_n)), & G \geq 2^{2 \cdot K} \end{cases}$$

$$I_n = I(t_n) = \cos(\theta'_G(t_n)) = \begin{cases} \cos(\theta'_G(t_n)), & G < 2^{2 \cdot K} \\ \cos(\theta'_{2^{2 \cdot K+1}-G-1}(t_n)), & G \geq 2^{2 \cdot K} \end{cases}$$

wherein the value of K is determined by parameter BT which is the product of the lower 3 dB bandwidth of the low pass Gaussian filter and the time needed for transmitting one-bit digital data; $d_i$ represents the input digital data (when input digital data is equal to 1, then $d_i=1$; when the input digital data is equal to 0, then $d_i=-1$); G represents the storage amount of tables; θ represents the phase shift of the modulation; $T_b$ represents the time needed for transmitting one-bit digital data; and sampling time is expressed by:

$$t_n = \left\{\frac{2 \cdot n + 1}{2 \cdot M} - \frac{1}{2}\right\} \cdot T_b; \quad n = 0, 1, 2, 3, \ldots, M - 1.$$

19. The method of claim 18, wherein said tabular data stored is either expressed by a sine function or a cosine function due to the symmetrization property of the triangle functions.

20. A computer readable storage medium for recording a method for performing Gaussian Minimum Shift Keying baseband modulation based on a reference phase $\theta_{ref}$ to be simplified, said method applied in communication system and used for modulating input digital data into digital in-phase signal $I_n$ and digital quadrature-phase signal $Q_n$, said method comprising the following steps:

(a) building and storing a plurality of parameters and their corresponding tabular data of a low pass filter, said parameters and their corresponding tabular data being simplified in advance; said low pass filter being used for reducing the bandwidth needed and increasing the utilization of the bandwidth;

(b) sequentially recording said input digital data;

(c) determining a reference phase $\theta_{ref}$, said reference phase being generated by the following equation:

$$\theta_{ref} = \sum_{i=-\infty}^{-K-1} d_i \cdot \frac{\pi}{2}$$

wherein the value of K depends on a parameter BT which is the product of a lower 3 dB bandwidth of a low pass Gaussian filter and the time needed for transmitting one-bit digital data; $d_i$ represents the input digital data and; when input digital data is equal to 1, then $d_i=1$; when the input digital data is equal to 0, then $d_i=-1$;

(d) receiving the tabular data which is associated with said input digital data; and (e) generating a digital in-phase signal $I_n$ and a digital quadrature-phase signal $Q_n$ by using said reference phase and said received tabular data.

21. The medium of claim 20, wherein said plurality of parameters and the tabular data associated with said parameters stored in step (a) comprises:

$$Q_n = Q(t_n) = \sin(\theta'_G(t_n)) = \begin{cases} \sin(\theta'_G(t_n)), & G < 2^{2 \cdot K} \\ -\sin(\theta'_{2^{2 \cdot K+1} - G - 1}(t_n)), & G \geq 2^{2 \cdot K} \end{cases}$$

$$I_n = I(t_n) = \cos(\theta'_G(t_n)) = \begin{cases} \cos(\theta'_G(t_n)), & G < 2^{2 \cdot K} \\ \cos(\theta'_{2^{2 \cdot K+1} - G - 1}(t_n)), & G \geq 2^{2 \cdot K} \end{cases}$$

wherein the value of K is determined by parameter BT which is the product of the lower 3 dB bandwidth of the low pass Gaussian filter and the time needed for transmitting one-bit digital data; G represents the storage amount of tables; θ represents the phase shift of the modulation; $T_b$ represents the time needed for transmitting one-bit digital data; and sampling time is expressed by:

$$t_n = \left\{\frac{2 \cdot n + 1}{2 \cdot M} - \frac{1}{2}\right\} \cdot T_b; \quad n = 0, 1, 2, 3, \ldots, M - 1.$$

22. The medium of claim 20, wherein the tabular data of said medium includes the sampling points of a curve formed by $\sin(\theta'_0(t)) \sim \sin(\theta'_{2^{2 \cdot K}-1}(t))$, wherein θ represents the phase shift of said baseband modulation.

* * * * *